Figure 1:
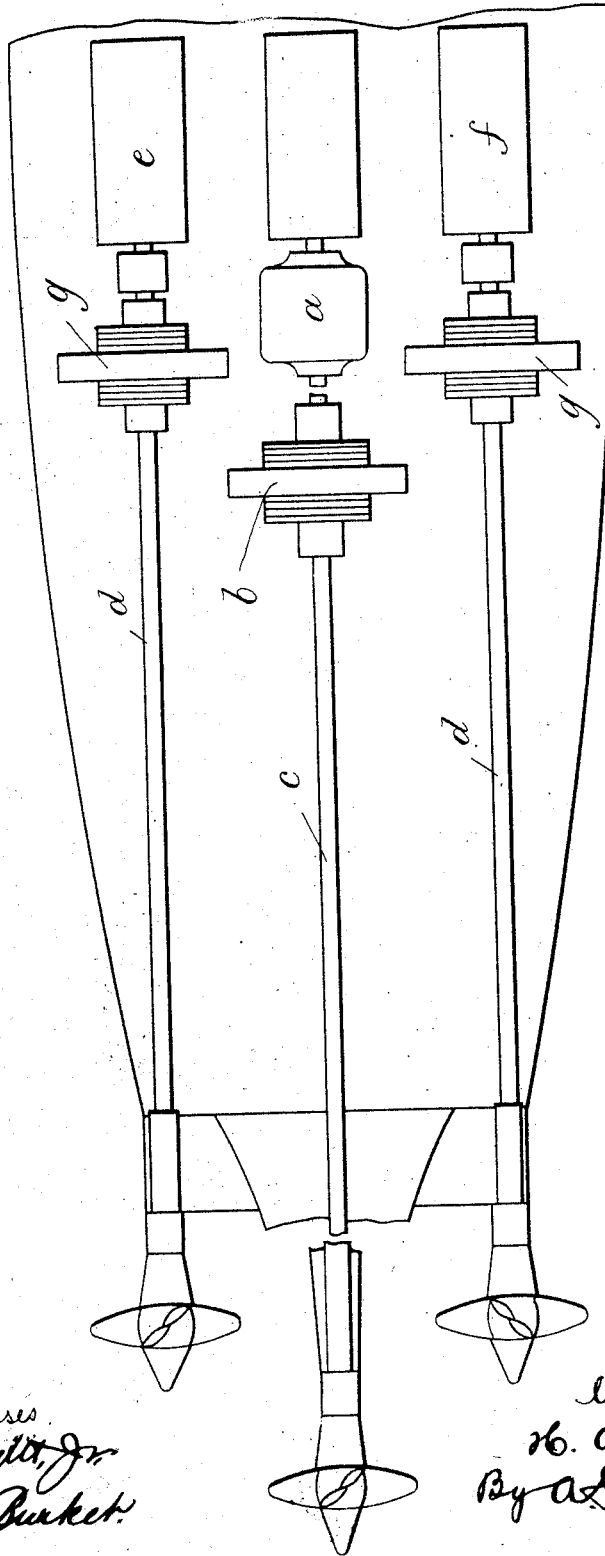

H. A. MAVOR.
PROPULSION OF SHIPS.
APPLICATION FILED SEPT. 20, 1909.

983,917.

Patented Feb. 14, 1911.
4 SHEETS—SHEET 1.

H. A. MAVOR.
PROPULSION OF SHIPS.
APPLICATION FILED SEPT. 20, 1909.

983,917.

Patented Feb. 14, 1911.
4 SHEETS—SHEET 2.

Witnesses.
C. P. Wright Jr.
L. S. Bucket.

Inventor.
H. A. Mavor,
By A. S. Pattison,
Atty.

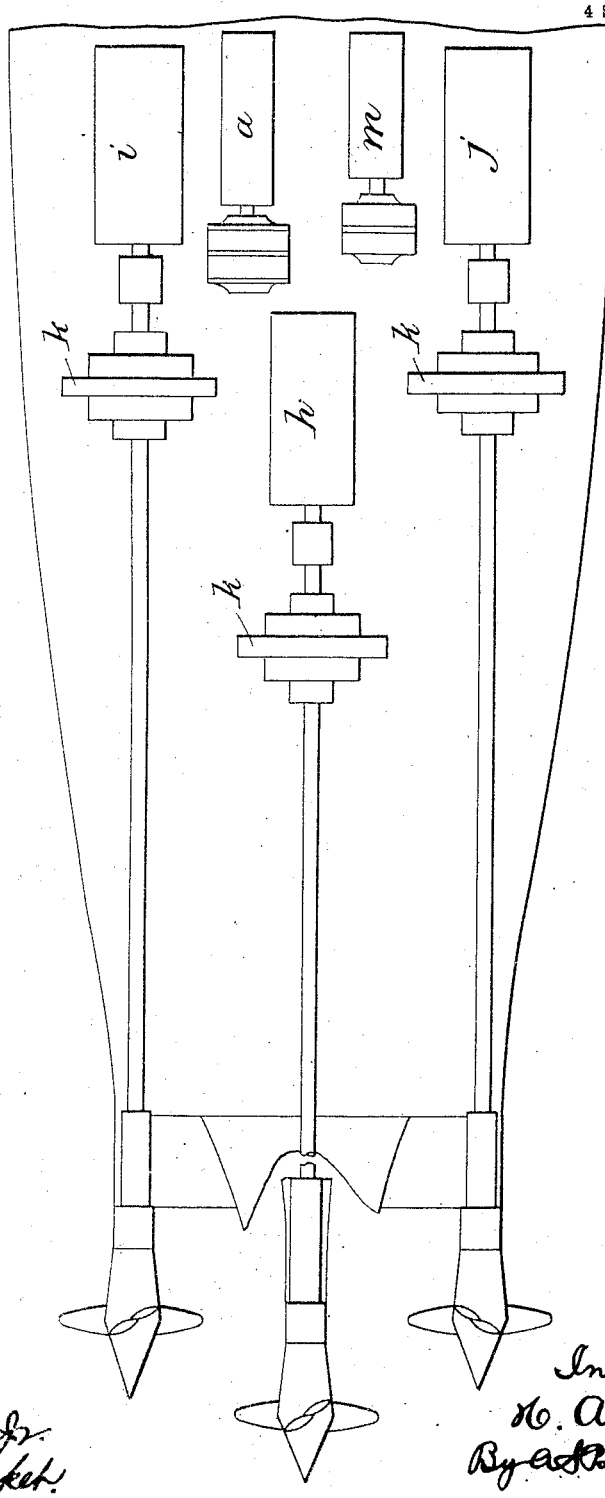

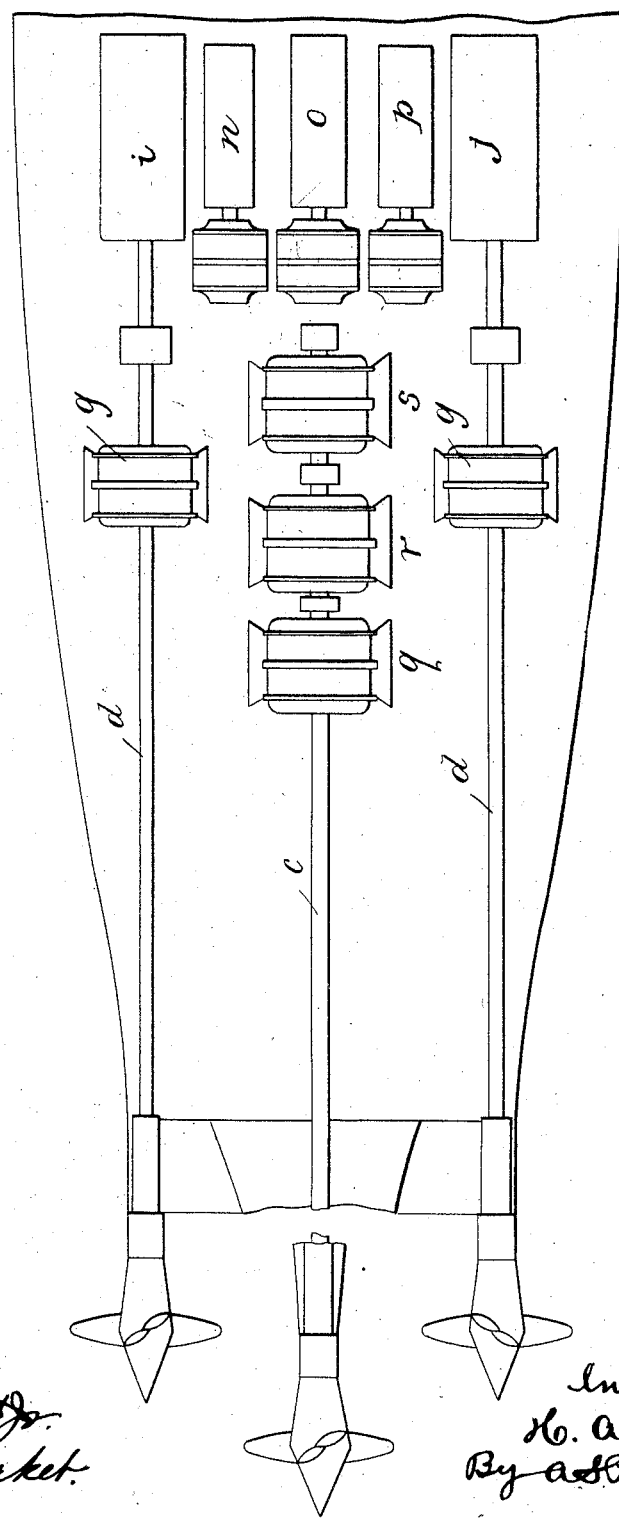

UNITED STATES PATENT OFFICE.

HENRY ALEXANDER MAVOR, OF GLASGOW, SCOTLAND.

PROPULSION OF SHIPS.

983,917.  Specification of Letters Patent. Patented Feb. 14, 1911.

Application filed September 20, 1909. Serial No. 518,559.

*To all whom it may concern:*

Be it known that I, HENRY ALEXANDER MAVOR, a subject of the King of Great Britain and Ireland, residing at Glasgow, Scotland, have invented Improvements in or Relating to the Propulsion of Ships, of which the following is a specification.

This invention relates to the propulsion of ships and more particularly war vessels which are to be capable of running at high speeds although also frequently only performing long runs at low or reduced speeds. As is well known, the power increase is not proportional to the speed so that roughly speaking the power required to propel a given vessel at half speed is only approximately about one eighth of the power required for full speed.

The object of the present invention is to fit a vessel with a complete power equipment which will fulfil the requirements of the various services to which it may be put, in an economical manner, and the cost and weight of which will be reduced in comparison with the equipments at present employed. For this purpose there is installed in the vessel, a main plant of any ordinary character without intermediary electric transmission and of a power less than that required to propel the vessel at full speed, with which is combined a supplementary electrical equipment of a special character appropriate for propelling the vessel at a low or reduced speed and capable also of being utilized in conjunction with the main plant to drive the vessel at full speed.

The invention may be carried into effect in various ways. For example, taking a cruiser requiring 18000 H. P. for a speed of 24 knots and which may be required to cruise for more or less protracted periods at 16 knots, the main power plant may have a capacity sufficient to produce about 12,000 H. P. and the supplementary electric plant be designed to supply about 6,000 H. P.

Conveniently, the main power plant may comprise one or more marine turbines supplied with steam from a generator or generators which is or are fired with oil fuel, this being an arrangement which will enable an oil engine, supplied from the same fuel source, to be used for the supplementary electric power plant. Obviously however the electric generator or generators of the supplementary electric plant might be driven by turbines supplied with steam from the main boilers or from independent boilers; or a gas engine or engines might be employed to drive the said electric generator or generators.

The motor or motors of the supplementary electric plant comprising one or more electric generators may conveniently be of the multiphase type described in the specification of my former Patent No. 912144 where speed variation is obtained with the aid of a multiphase controlling motor. In other cases, there may be used in combination with a plurality of collectively driven alternators having different periodicities, a plurality of motors corresponding, or not, in number with the alternators and each possessed of a different number of poles to the others so that when severally connected with each appropriate alternator of the corresponding number of alternators, or with each of some of a non-corresponding number of alternators, the same speed of rotation will be produced, this being an arrangement which enables the capacity of the generator of higest periodicity to be reduced, all in the manner described in the specification of a former British Patent No. 11183 of 1907.

By employing alternating current motors according to either of the two last described patents, speed variations can be obtained depending upon the characteristics of such motors but these speeds are capable of further variation by employing means such as is described in the specification of British Patent No. 28040 of 1907, wherein the electric energy is supplied to the motor or motors intermittently, or with a more or less intermittent effect, so that the work to be done is accomplished with full power at intervals in contradistinction to continuously with lower power. In this way the electric motor or motors may be mounted upon the turbine or other motor driven shaft of the main power equipment and its or their speed adjusted to the speed at which it is desired to run the ship, the auxiliary electrically produced power being thus added to the main (normally produced) power at the required speed of rotation, or the said supplementary electric plant being used alone while cruising at low or reduced speeds and the turbine or other engine of the main power equipment arranged to be disconnected at this time from the shaft which it is adapted to drive, or else in the case of steam engines and turbines connected to the condenser so that the pistons of the engine cylinders, or the rotor of the turbine, work of works *in vacuo* when they are not required to generate power. The disconnection of the shaft from its turbine or engine may be effected by slip couplings, by the withdrawal of the coupling bolts pertaining thereto, or by clutches magnetically or otherwise controlled.

The supplementary electric plant may, in some cases, embody motors, for operation of auxiliaries on board the vessel, equal or approximately equal in power to the power of the motor or motors used in propelling the vessel at reduced speed and adapted to be used alternatively with such propelling motor or motors, substantially as described in former British specification No. 12386 of 1907.

The control of the motors may be effected by means such as is set forth in the specification of my application for Patent No. 516,285 dated September 4th 1909 wherein provision is made against the opening of the circuit of the motor or motors at a switch for effecting change of running conditions before the value of the current being supplied thereto is reduced to a safe point.

In the accompanying illustrative drawings Figures 1, 2, 3 and 4 are diagrammatic plans each showing a portion of a ship intended to represent a 24 knot 18000 horse power cruiser provided with a motor equipment according to the present invention, the several figures showing various arrangements of power plants.

Referring to Fig. 1 which is intended to represent a 24 knot 18000 horse power cruiser, $a$ is a turbo-electric generator having two poles and running at 740 revolutions per minute developing 6000 H. P., and $b$ is an electric motor developing 6000 H. P. mounted on the central shaft $c$ and energized by the generator $a$. The wing shafts $d$ are driven directly by the high and low pressure systems $e$ and $f$ respectively of an ordinary marine steam turbine developing 6000 H. P. in each element. The wing shafts $d$ are further provided, for alternative application, with electric motors $g$, each developing 2000 H. P. at 370 revolutions per minute.

All three electric motors are of the type described in the specification of my said former Patent No. 912144, the main elements having six poles and a synchronous speed of about 246 revolutions per minute, while the controlling elements (hereinafter called the "spinner" elements) have twelve poles and a synchronous speed of 123 revolutions per minute, so that by subtracting, dispensing with or adding such speeds, the main motor elements can be used to give respectively speeds of 123, 246 and 370 revolutions per minute approximately. At full power and full speed, the motor $b$ on the central shaft $c$ develops 6000 H. P. and the motors $g$ on the wing shafts $d$ are idle. Down to 16½ knots, the speed change is effected by throttling the steam supplied to all of the turbines, or, in the case of the turbo-electric generator, by the interruption of current supplied to the electric motor in the manner described in the said former British specification No. 28040 of 1907. At 16½ knots the turbines $e$, $f$ are thrown out of action by being uncoupled from their shafts, or remaining coupled and running *in vacuo*. The motors $g$ would then be supplied with current, the spinners of the motors $b$ $g$ being held stationary and the turbine of the generator $a$ run at about four per cent. above its normal full speed and at approximately its full load. The electric motors would run at an increase of about four per cent. on their normal intermediate speed of 246 revolutions per minute and at this speed the motors $b$ and $g$ must develop 2000 H. P. each.

The turbine of the generator $a$ can be slowed down without material loss of economy to twenty per cent. below its normal full speed so that the said generator can run economically at 600 revolutions per minute and the electric motors at 200 revolutions per minute. This speed of revolution corresponds to about thirteen knots. A further reduction of speed of the generator turbine, with a slight loss of economy, would in the same manner reduce the speed to twelve knots, while for lower speeds the spinners would be brought into use in the reverse direction.

Figure 2:
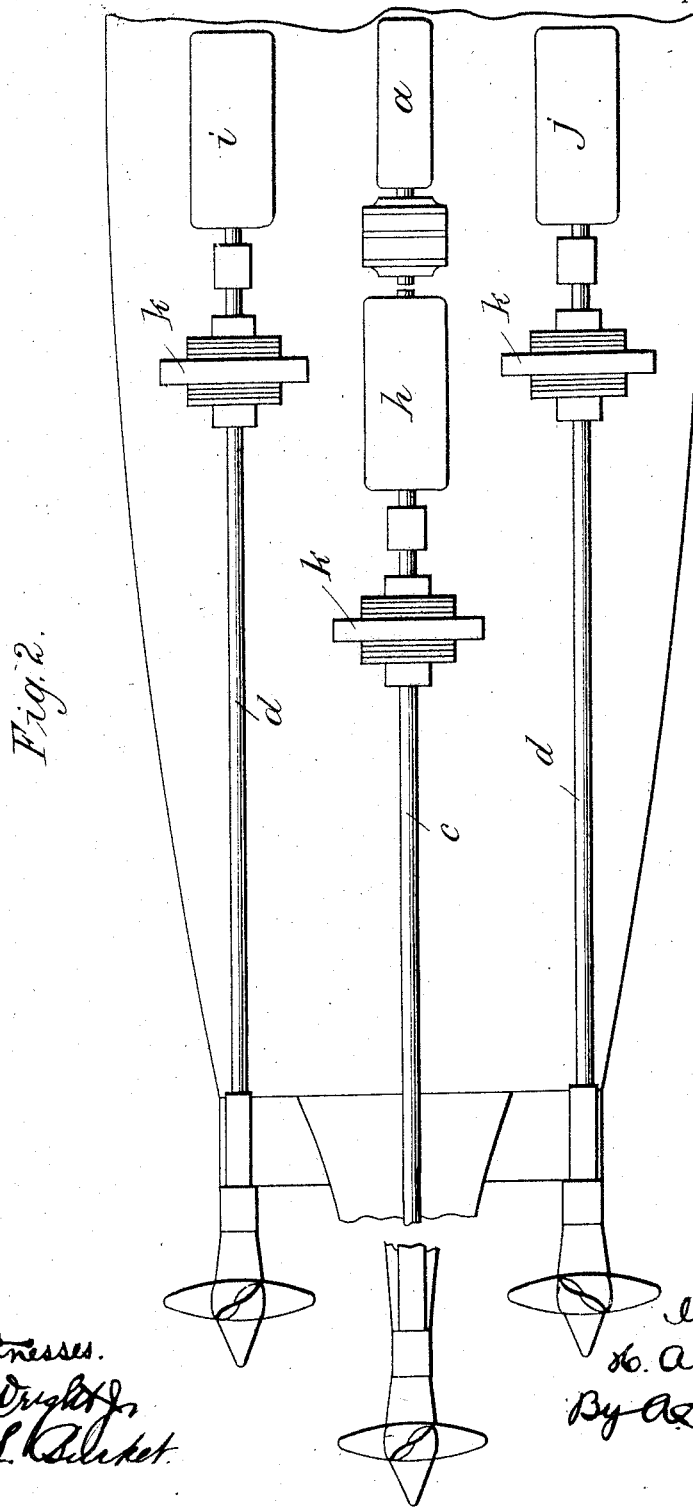

In Fig. 2, the three shafts $c$, $d$ are driven by a normal steam turbine equipment, comprising high pressure, intermediate and low pressure systems $h$, $i$, $j$, of about 5000 H. P. each. The electric equipment consists of a turbine generator $a$ of 3000 H. P. at say 600 to 740 revolutions per minute and of a 1000 H. P. motor $k$, with spinner, on each shaft. This arrangement provides for no intermediate speeds between 24 knots and 13 knots except by reduction in turbine speed or electric current interruption as already hereinbefore referred to. At 13 knots the spinners of the electric motors are stopped and the motors run at 200 revolutions per minute, the generator turbine $a$ being reduced to the corresponding speed of 600 revolutions per minute, at which speed it is designed to give its full 3000 H. P. At 12 knots and at a slower speed, the conditions are the same as described with reference to Fig. 1.

Where it is desired to drive the auxiliaries of the ship electrically, an arrangement such as is shown in Fig. 3 may be adopted in which there is provided a turbo generator $m$ of 1000 H. P. additional to the plant shown in Fig. 2. In this case the auxiliaries can be run with power derived from either of the generators *a* or *m*, or with power derived from three or more sources by subdivision of the generator *m*, and in the event of disablement of any part of the plant, the vessel can be moved alternatively by the marine steam turbines *h*, *i*, *j*, by the motors *k* supplied with power from the main electric generator *a*, or at slower speeds by the electric generator *m*, or its subdivisions, normally used for operating the auxiliaries. The equipment provides at full speed 18000 H. P. with the necessary additional power for auxiliaries; at 13 knots 3000 H. P. including if necessary the auxiliaries; and at 8 knots 1000 H. P. including the auxiliaries.

As already explained, speed change of the motors can be secured in the manner described in the said former British specification No. 11183 of 1907, to exemplify which Fig. 4 has been added. In this example, the total power is 18,500 H. P., the wing shafts *d* being each driven by a 6000 H. P. turbine *i* or *j* and the turbo-generator being divided into three units *n*, *o*, *p* whereof *n* and *p* are of 2000 H. P. each while *o* is of 2500 H. P. The motors *q* on the wing shafts are of 800 H. P. while the center shaft is provided with three motors *q*, *r*, *s* each of 2000 H. P., but the motor *q* having 8 poles whereas the motors *r*, *s* have each four poles. These motors are of the ordinary squirrel cage type without spinners. Two, namely *n*, *p*, of the three generators *n*, *o*, *p* are two pole machines and the third *o* is a four pole machine. At full speed all three generators are used together to supply current to the motors *q*, *r* and *s* on the center shaft, running at 370 revolutions per minute. At half speed the generator *o* is alone used to supply the motors *q* on the wing shafts and to drive the eight pole motor *q* on the center shaft giving about the same power. Speeds intermediate of those capable of being attained by the method described in the said former British specification No. 11183 of 1907 are obtained by throttling of steam, or interruption of current, as already hereinbefore referred to. Obviously the turbo-generator plant and motors of Figs. 2 and 3 may be modified to enable speed change to be secured as just described.

What I claim is:—

1. For the propulsion of a ship, the combination with a main thermo-mechanical plant of a supplementary alternating current electric plant capable of being used either alone or in conjunction with the main plant, at will, for driving the ship at different speeds and comprising an alternating current driving equipment capable of being run at different speeds.

2. For the propulsion of a ship, the combination with a main thermo-mechanical plant of a supplementary multi-phase electric plant capable of being used either alone or in conjunction with the main plant, at will, for driving the ship at different speeds and comprising a multiphase driving equipment capable of being run at different speeds.

3. For the propulsion of a ship, a power equipment comprising a main plant of a power less than that required to propel the ship at full speed and a supplementary alternating current electric equipment of a power appropriate for propelling the vessel at a low or reduced speed and capable of being utilized in conjunction with the main plant to drive the ship at full speed, said electric equipment comprising electric driving means having a characteristic that will admit of such equipment being run at different speeds.

4. A power equipment for a ship, comprising a turbine plant for effecting propulsion alone and a multiphase electric plant adapted to be used alone for propulsion at a low speed or to be used jointly with the turbine plant to procure propulsion at full speed, said electric plant comprising one or more multiphase electric motors, having a characteristic that will admit of their being driven at definite different speeds.

5. A power equipment for a ship, comprising a plurality of propeller shafts, turbines driving certain of such shafts, multiphase electric motors on the several shafts, and turbo driven multiphase electric generating plant adapted to supply current to such motors.

6. A power equipment for a ship, comprising a plurality of propeller shafts, turbines driving certain of such shafts, multiphase electric motors on the several shafts and a sub-divided turbo-driven multiphase generator plant adapted to supply current to such motors.

7. A power equipment for a ship, comprising a plurality of propeller shafts, turbines driving certain of such shafts, a multiphase electric current motor on each of such turbine driven shafts, a plurality of multiphase electric motors on another of said shafts and a multiphase electric current generator plant divided into units for supplying multiphase current to the various motors in different ways.

8. For the propulsion of a ship, the combination with a main thermo-mechanical driving plant of a power less than that required to propel the vessel at full speed, of a supplementary electric equipment comprising multiphase induction driving motors, multiphase controlling motors therefor and a multiphase alternate current generator for supplying energy to the driving and controlling motors, the said electric equipment being arranged to be used alone for propelling the vessel at a low or reduced speed and capable of being utilized in conjunction with the thermo-mechanical driving plant to drive the ship at full speed.

9. A power equipment for a ship, comprising a turbine propulsion plant and an electric propulsion plant comprising multiphase induction driving motors, multiphase controlling motors for the driving motors and a generator for supplying multiphase current to all the motors in different ways to effect speed change, said turbine propulsion plant being arranged to be used alternatively or conjointly with the electric propulsion plant.

10. A power equipment for a ship, comprising in combination with a plurality of propeller shafts, turbines for driving certain of such shafts, multiphase electric induction driving motors on the said turbine driven shafts, each such driving motor being controlled by a "spinner", and a turbo-alternator adapted to supply multiphase current to the several motors and "spinners" in different ways to effect speed change.

11. A power equipment for a ship, comprising in combination with a plurality of propeller shafts, turbines for driving certain of such shafts, multiphase electric induction driving motors on the said turbine driven shafts, each such driving motor being controlled by a "spinner", and a sub-divided turbo-generator plant adapted to supply multiphase current to the motors and "spinners" in different ways to effect speed change.

12. A power equipment for a ship, comprising in combination with a plurality of propeller shafts, turbines for driving certain of such shafts, an electric induction motor on each of said turbine driven shafts and each controlled by a "spinner", a plurality of electric induction motors on another shaft, and an electric generator plant divided into units for supplying current to the various motors and spinners in different ways, to effect speed change.

Signed at London, England this 9th day of September 1909.

HENRY ALEXANDER MAVOR.

Witnesses:
WILLIAM PRINGLE,
ARTHUR A. FISHER.